United States Patent
Nishidate

(10) Patent No.: US 10,312,771 B2
(45) Date of Patent: Jun. 4, 2019

(54) BRUSHLESS MOTOR

(71) Applicant: Tokyo Parts Industrial Co., Ltd., Gunma-ken (JP)

(72) Inventor: Masahiro Nishidate, Gunma-ken (JP)

(73) Assignee: Tokyo Parts Industrial Co., Ltd. (JP)

( * ) Notice: Subject to any disclaimer, the term of this patent is extended or adjusted under 35 U.S.C. 154(b) by 323 days.

(21) Appl. No.: 15/286,926

(22) Filed: Oct. 6, 2016

(65) Prior Publication Data

US 2017/0141646 A1    May 18, 2017

(30) Foreign Application Priority Data

Nov. 13, 2015 (JP) ................. 2015-222949
Sep. 1, 2016 (JP) ................. 2016-170515

(51) Int. Cl.
*H02K 7/08* (2006.01)
*H02K 21/16* (2006.01)
*H02K 21/22* (2006.01)
*H02K 5/167* (2006.01)

(52) U.S. Cl.
CPC ........... *H02K 7/085* (2013.01); *H02K 5/1675* (2013.01); *H02K 21/16* (2013.01); *H02K 21/22* (2013.01); *H02K 2205/03* (2013.01)

(58) Field of Classification Search
CPC ........ H02K 5/1675; H02K 5/16; H02K 7/085; F16C 33/1047; F16C 17/107; F16C 33/104; F16C 2226/12; F16C 2380/26
USPC ............................................. 310/90, 89, 91
See application file for complete search history.

(56) References Cited

U.S. PATENT DOCUMENTS

| 9,143,017 | B2 * | 9/2015 | Horng | H02K 5/167 |
| 2014/0118859 | A1 * | 5/2014 | Yun | G11B 19/2036 360/99.12 |
| 2014/0199189 | A1 * | 7/2014 | Tamaoka | F04D 25/062 417/354 |
| 2016/0072358 | A1 * | 3/2016 | Roland | H02K 7/025 307/68 |
| 2016/0099631 | A1 * | 4/2016 | Kim | H02K 7/086 360/75 |
| 2016/0102672 | A1 * | 4/2016 | Liu | F04D 29/058 417/423.12 |

FOREIGN PATENT DOCUMENTS

| CA | 2796481 A1 * | 10/2013 | A45D 20/12 |
| JP | 2532489 | 4/1997 | |

OTHER PUBLICATIONS

U.S. Appl. No. 15/277,163, Masahiro Nishidate, filed Sep. 27, 2016.
U.S. Appl. No. 15/287,029, Masahisa Tuchiya, filed Oct. 6, 2016.

* cited by examiner

*Primary Examiner* — Forrest M Phillips
(74) *Attorney, Agent, or Firm* — Jordan and Koda, PLLC

(57) ABSTRACT

The bottom end of a rotary shaft contacts a cover part of a cover member, while the top end of the rotary shaft protrudes upwards from a retaining plate. A planar first washer member, which is made from a hard material, is fastened to the rotary shaft, between a bottom plate of a rotor case and an oil-impregnated bearing. The first washer member is disposed without contact with the bottom plate of the rotor case and the oil-impregnated bearing.

9 Claims, 3 Drawing Sheets

BRUSHLESS MOTOR

BACKGROUND OF THE INVENTION

The present invention relates to a brushless motor, which can be used, for example as an electric motor provided with a reduction mechanism for feeding paper money that has been inserted into a vending machine into a paper money transport path.

For example, Japanese Utility Model Registration Publication No. 2532489 describes a brushless motor covered by a frame (cover member). In this brushless motor an armature core (stator core) is fastened to the outside of an insulator (bearing holder), which is fastened to a printed circuit board (retaining plate), and a magnet (rotor magnet) that faces the outside of this armature core is fastened to the inner circumferential face of a rotor frame (rotor case). A rotary shaft that is fastened to the center of this rotor frame is supported by an oil-impregnated sintered bearing that is fastened to the center of the frame, and by an oil-impregnated sintered bearing that is fastened to the printed circuit board, and the top end of the rotary shaft protrudes from the frame.

However, in Japanese Utility Model Registration Publication No. 2532489, cumulative manufacturing variations in the dimensions of the parts result in large variations in the amount by which the rotor frame moves in the thrust direction (thrust play).

That is to say, the printed circuit board, the insulator and the armature core are each manufactured with tolerances in the axial dimensions of the parts and, in the assembly process, these tolerances are cumulative, such that there will be a greater dimensional tolerance in mounting the rotor frame, on which the magnet that faces this armature core is fastened, on the rotary shaft. Consequently, there will be great variation in the thrust play (gap in the thrust direction) between the rotor frame that is fastened to the rotary shaft and the oil-impregnated sintered bearing that is fastened to the center of the frame.

SUMMARY OF THE INVENTION

The present invention is directed to providing a brushless motor that can solve the problems described above and limit variation in thrust play.

A first aspect of the present invention relating to a brushless motor comprises:
a bearing holder having a first cylindrical part;
an oil-impregnated bearing fastened to the inner circumferential face of the bearing holder;
a rotary shaft supported by the oil-impregnated bearing so as to be rotatable around a vertically oriented central axis;
a rotor having a rotor case, which is fastened to the rotary shaft and has a second cylindrical part and a bottom plate that closes the bottom end of the second cylindrical part, and a rotor magnet fastened to a circumferential face of the rotor case;
a stator, arranged so as to face the rotor magnet in the radial direction;
a retaining plate that extends radially outward from the top of the first cylindrical part;
a cover member, which has a third cylindrical part and a cover part that closes the bottom end of the third cylindrical part, the top end of the third cylindrical part being fastened to the retaining plate, so as to cover the rotor and the stator, wherein,
the bottom end of the rotary shaft contacts the cover member and the top end of the rotary shaft protrudes upward from the retaining plate;
a first washer member, which is made from a hard material and has a flat face, is fastened to the rotary shaft, between the bottom plate and the oil-impregnated bearing; and
the first washer member is disposed without contact with the bottom plate or the oil-impregnated bearing.

In a second aspect of the present invention,
a burring part, which fastens the rotary shaft, rises upward in the center of the bottom plate; and
the first washer member is disposed without contact with the top end of the burring part.

In a third aspect of the present invention,
a second washer member, which is made from a soft material and has a flat face, is provided on the rotary shaft, between the first washer member and the oil-impregnated bearing; and
the second washer member is disposed without contact with the oil-impregnated bearing.

In a fourth aspect of the present invention,
the outer diameters of the first washer member and the second washer member are smaller than the inner diameter of the first cylindrical part.

In a fifth aspect of the present invention,
the rotor magnet is fastened to the inner circumferential face of the second cylindrical part;
the stator has a stator core fastened to the outer circumferential face of the first cylindrical part; and
the stator core is disposed facing the inner circumferential face of the rotor magnet in the radial direction.

With the present invention, variation in thrust play can be reduced. Note that, in the present specification, thrust play refers to the distance that the rotary shaft can travel in the axial direction.

DETAILED DESCRIPTION OF THE PREFERRED EMBODIMENTS

Figure 1:
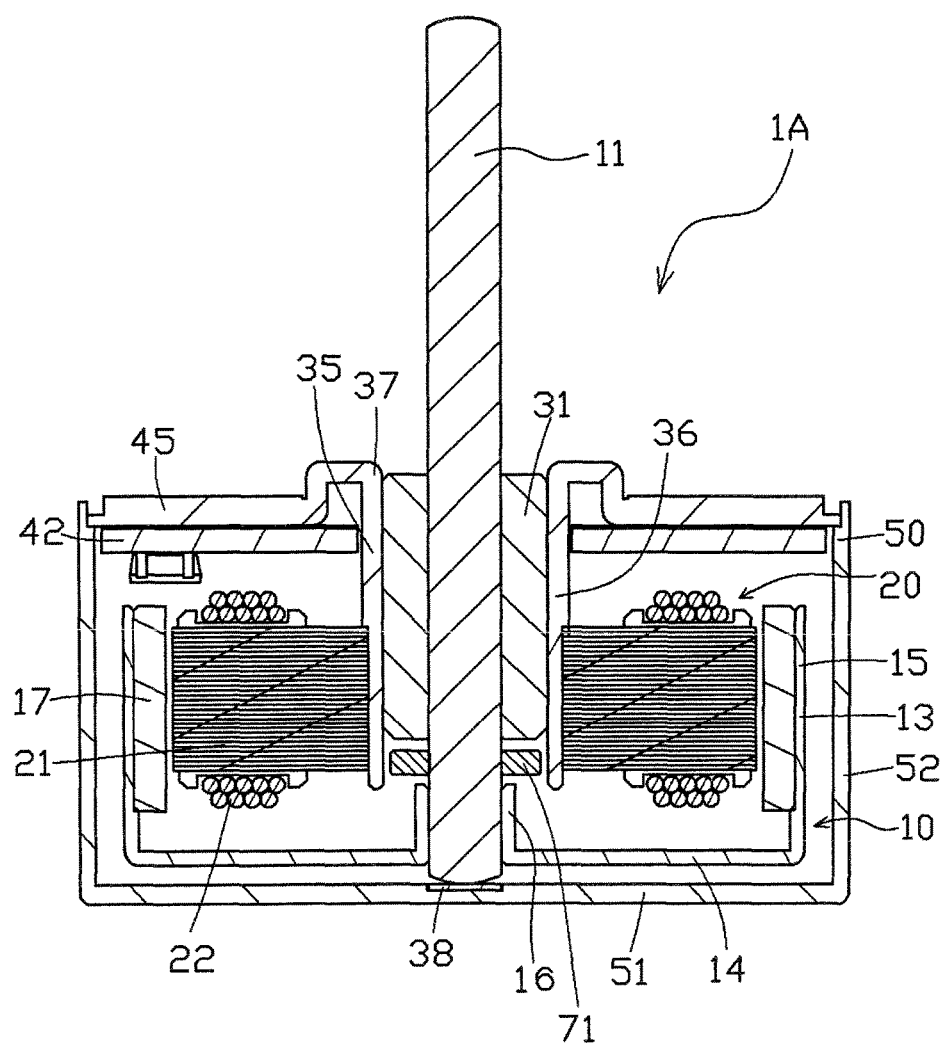
FIG. 1 is a sectional view of a brushless motor according to a first exemplary mode of embodiment of the present invention.
Figure 2:
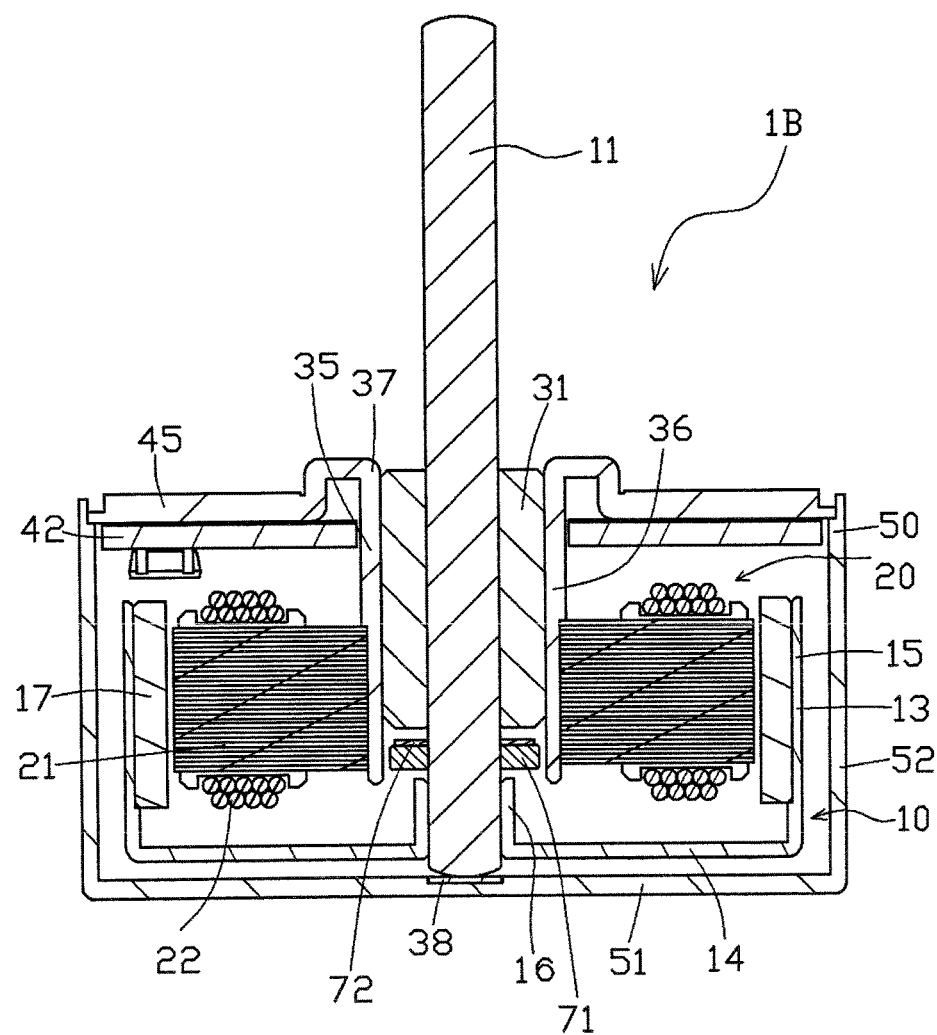
FIG. 2 is a sectional view of a brushless motor according to a second exemplary mode of embodiment of the present invention.
Figure 3:
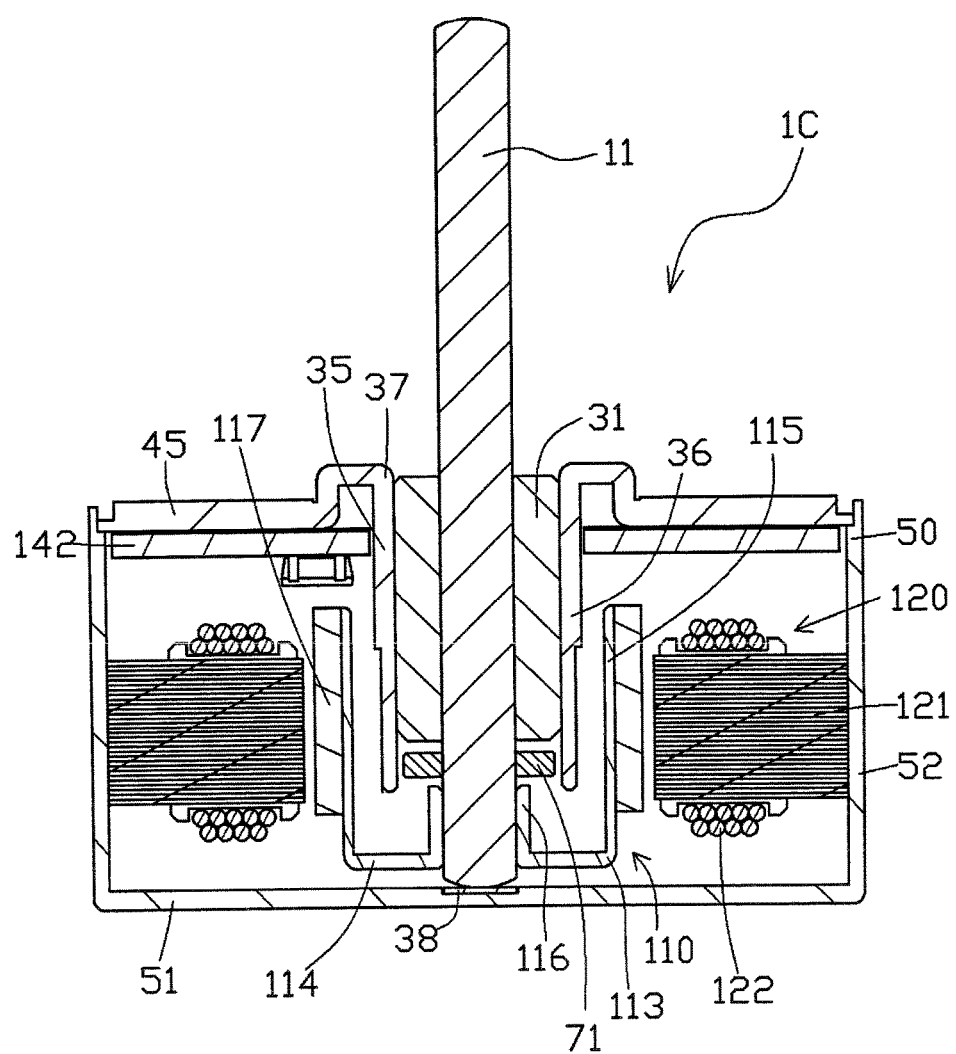
FIG. 3 is a sectional view of a brushless motor according to a third exemplary mode of embodiment of the present invention.

In the present specification, upward in the central axial direction of the motor in FIG. 1 to FIG. 3 is referred to simply as "upward" and downward in the central axial direction of the motor in FIG. 1 to FIG. 3 is referred to simply as "downward." Note that, the upward and downward directions do not indicate positional relationships or directions when the actual device is assembled. Furthermore, the direction parallel to the central axis is referred to as the "axial direction," the radial direction having the central axis as its center is referred to simply as the "radial direction," and the circumferential direction having the central axis as its center is referred to simply as the "circumferential direction."

Hereinafter modes of embodiment of the present invention are illustratively described based on the drawings.

First Exemplary Mode of Embodiment

First, the configuration of a brushless motor 1A according to a first exemplary mode of embodiment of the present invention is described by way of FIG. 1. In the first exemplary mode of embodiment, an outer-rotor type brushless motor 1A is described, which is covered by a cover member 50.

As shown in FIG. 1, the brushless motor 1A in this example comprises a rotor 10, a rotary shaft 11, a stator 20, an oil-impregnated bearing 31, a bearing holder 35, a retaining plate 45, and a cover member 50.

The rotor 10 comprises a rotor case 13 and a rotor magnet 17.

The stator 20 comprises a stator core 21 and coils 22.

The oil-impregnated bearing 31 is a radial bearing, which receives radial loads on the rotary shaft 11. Note that an oil-impregnated sintered body, an oil-impregnated resin or the like can be used for the oil-impregnated bearing 31. The inner diameter of the oil-impregnated bearing 31 is formed slightly larger than the outer diameter of the rotary shaft 11.

The bearing holder 35 is formed from a metallic material and has a cylindrically shaped first cylindrical part 36. A retaining plate 45, which is described hereafter, is integrally formed at a top 37 of the first cylindrical part 36.

The oil-impregnated bearing 31 is fastened to the inner circumferential face of the first cylindrical part 36 of the bearing holder 35. The axial length of the first cylindrical part 36 is longer than the axial length of the oil-impregnated bearing 31, such that the oil-impregnated bearing 31 is encased within the first cylindrical part 36, without protruding from the top end or the bottom end of the first cylindrical part 36.

The rotary shaft 11 is supported by the oil-impregnated bearing 31 so as to be able to rotate around the center axis that is oriented in the vertical direction, the rotary shaft 11 being formed from metal, in the shape of an elongate cylinder.

The rotor case 13 rotates united with the rotary shaft 11. The rotor case 13 has a cylindrically shaped second cylindrical part 15, and a bottom plate 14, which closes the bottom end of the second cylindrical part 15, a drive rotor magnet 17 being provided on the inner circumferential face of the second cylindrical part 15. A burring part 16, produced by drawing, which fastens the rotary shaft 11, rises upward in the center of the bottom plate 14 of the rotor case 13, the bottom of the rotary shaft 11 being fastened by press fitting into the burring part 16.

The stator 20 is arranged so as to face the rotor magnet 17 in the radial direction. Specifically, the stator 20 has a stator core 21 that is fastened to the outer circumferential face of the first cylindrical part 36, and is disposed so as to face in the radial direction the inner circumferential face of the rotor magnet 17.

The stator core 21 is made from a laminate in which a plurality of core plates are laminated, and has a plurality of equidistant salient poles at the outer circumference thereof. Coils 22 are respectively wound on each of the salient poles. The stator core 21 serves to strengthen the magnetic flux in the coils 22 when current is passed through the coils 22.

The rotor magnet 17 is disposed facing the salient poles on the stator core 21, and generates a rotational force in the rotor 10. The rotor magnet 17 is formed in the shape of a ring, and is alternatingly magnetized with North and South poles, in the circumferential direction.

The retaining plate 45 is formed as a plate that extends radially outward from the top 37 of the first cylindrical part 36. The external profile of the retaining plate 45 is formed so as to be larger than the outer diameter of the rotor case 13, in the radial direction. A wiring board 42 is fastened to the bottom face of this retaining plate 45, and supplies power applied from the exterior to the coils 22 that are wound on the stator core 21.

The cover member 50 is formed from a hard material and covers the rotor 10 and the stator 20 from below. The cover member 50 has a cylindrically shaped third cylindrical part 52, and a cover part 51, which closes the bottom end of the third cylindrical part 52, and the top end of the third cylindrical part 52 is fastened to the outer circumference of the retaining plate 45.

A first washer member 71, which is made from a metallic or resinous hard material, is fastened to the rotary shaft 11, between the bottom plate 14 and the oil-impregnated bearing 31.

This first washer member 71 is disposed without contact with the oil-impregnated bearing 31. That is to say, the first washer member 71 is disposed with a gap between the first washer member 71 and the oil-impregnated bearing 31, in the axial direction. This first washer member 71 is provided so as to reduce variation in thrust play.

A part having flat faces having high degrees of flatness on the top face and the bottom face, the part being formed so that the external profile is circular, for example, by press working a thin flat piece of metal, is suitable for use as the first washer member 71.

The outer diameter of this first washer member 71 is formed larger than the inner diameter of the oil-impregnated bearing 31, and smaller than the outer diameter of the oil-impregnated bearing 31. Furthermore, the outer diameter of the first washer member 71 is formed larger than the outer diameter of the burring part 16.

Furthermore, the inner diameter of the first washer member 71 is formed slightly smaller than the outer diameter of the rotary shaft 11. When the first washer member 71 has been fastened by way of press fitting on the rotary shaft 11, the first washer member 71 rotates united with the rotary shaft 11.

Furthermore, the first washer member 71 is disposed without contact with the top end of the burring part 16. That is to say, the first washer member 71 is disposed with a gap provided between the first washer member 71 and the top end of the burring part 16.

Furthermore, the outer diameter of the first washer member 71 is smaller than the inner diameter of the first cylindrical part 36. Accordingly, when the rotary shaft 11 moves upward, the first washer member 71 comes into contact with the oil-impregnated bearing 31, without coming into contact with the first cylindrical part 36.

The first washer member 71, which is fastened to the rotary shaft 11, faces the bottom face of the oil-impregnated bearing 31, without contacting the same, and is disposed so as to be encased within the first cylindrical part 36 of the bearing holder 35, without contact with the inner circumferential face of the first cylindrical part 36 of the bearing holder 35.

Note that the rotary shaft 11, the burring part 16, the first washer member 71, the oil-impregnated bearing 31 and the bearing holder 35 are disposed coaxially.

Next, the method of assembling the brushless motor 1A in this example will be described.

The rotary shaft 11, the rotor case 13, the first washer member 71 and the rotor magnet 17 are prepared.

First, the rotary shaft 11 is fastened by way of press fitting into the burring part 16 of the rotor case 13. The rotor magnet 17 is fastened, from above, to the inner circumferential face of the second cylindrical part 15 of the rotor case 13 that is fastened to the rotary shaft 11 (resulting in a rotor 10 having a rotary shaft 11). Then, the first washer member 71 having top and bottom faces with high degrees of flatness is press fit from above the rotary shaft 11 onto the rotary shaft 11 to which the rotor case 13 is fastened, by pushing the top face so as not to contact the burring part 16 of the rotor case 13 (resulting in a first assembly).

Next, the oil-impregnated bearing 31, the bearing holder 35, the stator core 21, the coils 22 and the wiring board 42 are prepared.

First, the coils 22 are wound on to the salient poles of the stator core 21 (resulting in a stator 20).

Next, the oil-impregnated bearing 31 is press fit into the opening in the individual bearing holder 35 so as to be fastened to the inner circumferential face thereof. Then, the wiring board 42 is fastened to the bottom face of the retaining plate 45, which is provided at the top 37 of this bearing holder 35. Then, the stator 20 is fastened, from below, to the outer circumferential face of the first cylindrical part 36 of this bearing holder 35 (resulting in a second assembly).

Next, the thrust receiving member 38 and the cover member 50 are prepared.

The thrust receiving member 38 is fastened to the top face in the center of the cover part 51 of the cover member 50 (resulting in a third assembly).

Next, the top end of the rotary shaft 11 in the first assembly is inserted from below into the oil-impregnated bearing 31 in the second assembly, so as to assemble the first assembly and the second assembly, such that the rotary shaft 11 protrudes upward from the retaining plate 45. In this state, the cover member 50 of the third assembly covers the rotor 10 and the stator 20 from below, and the top end of the third cylindrical part 52 of the cover member 50 in the third assembly is fastened to the outer circumference of the retaining plate 45.

Thus, an outer-rotor type brushless motor 1A is completed, which is covered by the cover member 50.

When the brushless motor 1A in this example is provided with electrical power from the wiring board 42, the coils 22 are excited, whereby the rotor magnet 17 is subjected to force, and the rotor 10 rotates. Note that, if the brushless motor 1A in this example is used as a motor with a reduction mechanism, for example, a drive gear (not illustrated) is fastened to the portion of the rotary shaft 11 that protrudes upward from the retaining plate 45.

With the brushless motor 1A in this example, with the bottom end of the rotary shaft 11 abutting the thrust receiving member 38, there is a small gap in the axial direction between the first washer member 71 and the oil-impregnated bearing 31 (corresponding to the thrust play). Then, if an upward force of greater than or equal to a predetermined magnitude acts on the rotary shaft 11, the first assembly moves upward, and the first washer member 71 comes into contact with the oil-impregnated bearing 31.

In this example, the first washer member 71 is fastened to the rotary shaft 1 by press fitting, so as not to be in contact with the bottom plate 14 of the rotor case 13. Consequently, the first washer members 71 is fastened to the rotary shaft 11, without being impacted by the dimensional tolerance between the bottom end of the rotary shaft 11 and the bottom plate 14 of the rotor case 13. Further, because the first washer member 71 has a flat face having a high degree of flatness on the top face thereof, when fastened by press fitting onto the rotary shaft 11, the dimensional tolerance from the bottom end of the rotary shaft 11 to the top face of the first washer member 71 can be minimized. Accordingly, it is possible to limit variation in the gap between the first washer member 71 and the oil-impregnated bearing 31, and thus reduce variation in the thrust play.

Furthermore, the burring part 16 on the rotor case 13 is provided in order to increase the rotary shaft retraining strength when the rotary shaft 11 is fastened in the rotor case 13.

Supposing that the first washer member 71 was fastened in place on the rotary shaft 11 so as to make contact with the top end of the burring part 16, the dimensional tolerance from the bottom end of the rotary shaft 11 to the first washer member 71 would be impacted by the dimensional tolerance from the bottom end of the rotary shaft 11 to the bottom plate 14 of the rotor case 13, and by the dimensional tolerance from the bottom end of the burring part 16 to the top end, and thus the variation in the thrust play would be greater.

Meanwhile, in the brushless motor 1A in this example, the first washer member 71 is disposed without contacting the top end of the burring part 16. Consequently, the dimensional tolerance from the bottom end of the rotary shaft 11 to the first washer member 71 is not impacted by the dimensional tolerance from the bottom end of the rotary shaft 11 to the bottom plate 14 of the rotor case 13, or the dimensional tolerance from the bottom end of the burring part 16 to the top end. Accordingly, with the brushless motor 1A in this example, the dimensional tolerance from the bottom end of the rotary shaft 11 to the first washer member 71 is reduced and thus the variation in the thrust play will be reduced.

Furthermore, the burring part 16 of the rotor case 13 can be formed either in the upward direction or the downward direction, but in this example, the burring part 16 rises upward direction. The reason for this is that, in the present example, the rotary shaft 11 is supported by a single bearing (oil-impregnated bearing 31) and thus shaft vibration is likely to occur, but by having the burring part 16 rise upwards, the axial length of the oil-impregnated bearing 31 can be increased, whereby the shaft vibration can be suppressed.

Thus, because the burring part 16 that fastens the rotary shaft 11 rises upward, the retaining strength when the rotor case 13 is fastened on the rotary shaft 11 can be increased, while the shaft vibration can be decreased.

Second Exemplary Mode of Embodiment

Next, the configuration of a brushless motor 1B according to a second exemplary mode of embodiment of the present invention is described by way of FIG. 2.

In FIG. 2, parts that are the same as parts in FIG. 1 are given identical reference numerals, and description of these parts is omitted.

In the first exemplary mode of embodiment, when the rotary shaft 11 moves upward, the first washer member 71, which is made from a hard material, comes into contact with the oil-impregnated bearing 31. Meanwhile, in this example, a second washer member 72, which is made from a soft material, is provided on the rotary shaft 11, between the first washer material 71 and the oil-impregnated bearing 31, in order to limit the noise of the impact between the first washer member 71 and the oil-impregnated bearing 31 when the rotary shaft 11 moves upwards.

The second washer member 72 is one wherein a thin flat plate made from resin is pressed worked so as to form the external profile into a circular shape, and has flat faces with high degrees of flatness on the top and bottom faces.

The outer diameter of the second washer member 72 is formed larger than the inner diameter of the oil-impregnated bearing 31, and smaller than the outer diameter of the first washer member 71.

The inner diameter of the second washer member 72 is formed substantially the same as that of the rotary shaft 11.

When the second washer member 72 has been press fit onto the rotary shaft 11, the second washer member 72 rotates united with the rotary shaft 11 and with the first washer member 71. The second washer member 72 is arranged in contact with the top face of the first washer member 71. Furthermore, the second washer member 72 is arranged without contact with the bottom face of the oil-impregnated bearing 31. That is to say, the second washer member 72 is disposed with a gap between the second washer member 72 and the oil-impregnated bearing 31.

The thrust play of the brushless motor 1B having the configuration described above corresponds to the gap between the second washer member 72 and the oil-impregnated bearing 31.

In this example as well, the first washer members 71 is fastened to the rotary shaft 11, without being impacted by the dimensional tolerance between the bottom end of the rotary shaft 11 and the bottom plate 14 of the rotor case 13. Furthermore, the second washer member 72, which is made from a soft material, having flat faces, with a high degree of flatness, on the top and bottom faces thereof, and is arranged in contact with the top face of this first washer member 71. Accordingly, it is possible to limit variation in the gap between the second washer member 72 and the oil-impregnated bearing 31, and thus reduce variation in the thrust play.

Furthermore, in the brushless motor 1B in this example, when the rotary shaft 11 moves upwards, the first washer member 71, which is made from a hard material, does not come into contact with the oil-impregnated bearing 31, but rather the second washer member 72, which is made from a soft material, comes into contact with the oil-impregnated bearing 31, allowing for a reduction in the impact sound caused by thrust play.

Furthermore, in the brushless motor 1B in this example, the outer diameters of the first washer member 71 and the second washer member 72 are smaller than the inner diameter of the first cylindrical part 36 of the bearing holder 35. Accordingly, when the rotary shaft 11 moves upwards, the second washer member 72 reliably comes into contact with the oil-impregnated bearing 31, without the first washer member 71 and the second washer member 72 coming into contact with the first cylindrical part 36, whereby the rotary shaft 11 can easily slide.

Third Exemplary Mode of Embodiment

Next, the configuration of a brushless motor 1C according to a third exemplary mode of embodiment of the present invention is described by way of FIG. 3.

In FIG. 3, parts that are the same as parts in FIG. 1 and FIG. 2 are given identical reference numerals, and description of these parts is omitted.

In this example, the configuration of the rotor differs from that in the first exemplary mode of embodiment. That is to say, the first exemplary mode of embodiment was an outer-rotor type brushless motor, covered by a cover member 50, but this example is an inner-rotor type brushless motor covered by a cover member 50.

Hereafter, this example is described by way of comparison with the first exemplary mode of embodiment, but this example can also be applied to the second exemplary mode of embodiment.

In the first exemplary mode of embodiment, the rotor magnet 17 is fastened to the inner circumferential face of the second cylindrical part 15 of the rotor case 13, and the stator 20 has a stator core 21, which is fastened to the outer circumferential face of the first cylindrical part 36 of the bearing holder 35, the stator core 21 being disposed facing the inner circumferential face of the rotor magnet 17, in the radial direction.

Meanwhile, in this example, the rotor magnet 117 is fastened to the outer circumferential face of the second cylindrical part 115 of the rotor case 113, and the stator 120 has a stator core 121, fastened to the inner circumferential face of the third cylindrical part 52 of the cover member 50, the stator core 121 being disposed facing the outer circumferential face of the rotor magnet 117, in the radial direction.

A burring part 116, produced by drawing, which fastens the rotary shaft 11, rises upward in the center of the bottom plate 114 of the rotor case 113, the rotary shaft 11 being fastened by press fitting into the burring part 116.

The first washer member 71 is disposed without contact with the top end of the burring part 116 or the oil-impregnated bearing 31. That is to say, the first washer member 71 is disposed with a gap in the axial direction between the first washer member 71 and the rotor case 113 and the oil-impregnated bearing 31.

Next, the method of assembling the brushless motor 1C in this example will be described.

The rotary shaft 11, the rotor case 113, the first washer member 71 and the rotor magnet 117 are prepared.

First, the rotary shaft 11 is fastened by way of press fitting into the burring part 116 of the rotor case 113. The rotor magnet 117 is fastened to the outer circumferential face of the second cylindrical part 115 of the rotor case 113 that is fastened to the rotary shaft 11 (resulting in a rotor 110 having a rotary shaft 11). Then, the first washer member 71 having top and bottom faces with high degrees of flatness is press fit from above onto the rotary shaft 11 to which the rotor case 113 is fastened, by pushing the top face without contact with burring part 116 of the rotor case 113 (resulting in a fourth assembly).

Next, the oil-impregnated bearing 31, the bearing holder 35 and the wiring board 142 are prepared.

First, the oil-impregnated bearing 31 is press fit into the opening in the bearing holder 35 so as to be fastened to the inner circumferential face thereof. Then, the wiring board 142 is fastened to the bottom face of the retaining plate 45, which is provided at the top 37 of this bearing holder 35 (resulting in a fifth assembly).

Next, the thrust receiving member 38, the cover member 50, the stator core 121 and the coils 122 are prepared.

First, the coils 122 are wound on to the salient poles of the stator core 121 (resulting in a stator 120). Next, the thrust receiving member 38 is fastened to the top face in the center of the cover part 51 of the cover member 50. Furthermore, the stator 120 is fastened, from above, to the inner circumferential face of the third cylindrical part 52 of the cover member 50 (resulting in a sixth assembly).

Next, the top end of the rotary shaft 11 in the fourth assembly is inserted from below into the oil-impregnated bearing 31 in the fifth assembly, such that the rotary shaft 11 protrudes upward from the retaining plate 45. In this state, the cover member 50 of the sixth assembly covers the rotor 110 and the stator 120 from below, and the top end of the third cylindrical part 52 of the cover member 50 is fastened to the outer circumference of the retaining plate 45.

Thus, the rotary shaft 11 is supported in the oil-impregnated bearing 31, with the bottom end of the rotary shaft 11 making contact with the top face at the center of the cover part 51 of the cover member 50 (thrust receiving member 38) resulting in a brushless motor 1C, in which the top end of the rotary shaft 11 protrudes upward from the oil-impregnated bearing 31.

This example has a similar operational effect to that in the first exemplary mode of embodiment, and because an inner rotor is used, rotor the startup time can be reduced as compared to using an outer rotor.

Furthermore, modes in which the second exemplary mode of embodiment is configured as an inner-rotor type brushless motor, as in this example, also have similar operational effects to that in the second exemplary mode of embodiment, and because an inner rotor is used, the rotor startup time can be reduced as compared to using an outer rotor.

Three exemplary modes of embodiment of the present invention have been described above, but the present invention is not limited to these exemplary modes of embodiment, and various modifications are possible.

Specifically, in the foregoing description, the outer diameters of the first washer member 71 and the second washer member 72 were formed so as to be circular, but the external profiles of the first washer member 71 and the second washer member 72 may also be, for example, polygonal or elliptical.

Furthermore, in the foregoing description, the burring part 16, 116 was formed so as to rise upward from the center of the bottom plate 14, 114 of the rotor case 13, 113, but the burring part 16, 116 may be formed so as to descend downward from the bottom plate 14, 114 of the rotor case 13, 113.

Furthermore, in the foregoing description, the retaining plate 45 was formed integrally with the bearing holder 35, but a retaining plate that is separate from the bearing holder 35 may also be used.

Furthermore, in the foregoing description, the inner diameter of the second washer member 72 was formed substantially the same as the outer diameter of the rotary shaft 11, but the inner diameter of the second washer member 72 may be formed slightly larger than the outer diameter of the rotary shaft 11, and the second washer member 72 may be disposed rotatably, with respect to the rotary shaft 11.

Note that the retaining plate 45 serves as the mounting face when mounting the brushless motor in the mode of embodiment described above to, for example, a paper money transport device in a vending machine, and screw holes (not illustrated) for mounting are provided in the retaining plate 45.

What is claimed is:

1. A brushless motor comprising:
a bearing holder having a first cylindrical portion;
an oil-impregnated bearing fastened to the inner circumferential face of the bearing holder;
a rotary shaft supported by the oil-impregnated bearing so as to be rotatable around a vertically oriented central axis;
a rotor having a rotor case, which is fastened to the rotary shaft, and a rotor magnet, the rotor case having a second cylindrical portion and a bottom plate portion, the bottom plate portion closing a bottom end of the second cylindrical portion, and the rotor magnet fastened to a circumferential face of the rotor case;
a stator, arranged so as to face the rotor magnet in a radial direction;
a retaining plate that extends radially outward from a top of the first cylindrical portion; and
a cover member, which has a third cylindrical portion and a cover portion that closes a bottom end of the third cylindrical portion, a top end of the third cylindrical portion being fastened directly to the retaining plate, so as to cover the rotor and the stator, wherein:
a bottom end of the rotary shaft contacts the cover member and a top end of the rotary shaft protrudes upward from the retaining plate;
a first washer member, which is made from a hard material and has a flat face, is fastened to the rotary shaft, between the bottom plate portion and the oil-impregnated bearing; and
the first washer member is disposed without contact with the bottom plate portion and the oil-impregnated bearing.

2. The brushless motor according to claim 1, wherein
a burring part, which fastens the rotary shaft, rises upward in the center or the bottom plate portion; and
the first washer member is disposed without contact with a top end of the burring part.

3. The brushless motor according to claim 2, wherein:
a second washer member, which is made from a soft material and has a flat face, is provided on the rotary shaft, between the first washer member and the oil-impregnated bearing; and
the second washer member is disposed without contact with the oil-impregnated bearing.

4. The brushless motor according to claim 3, wherein
the outer diameters of the first washer member and the second washer member are smaller than the inner diameter of the first cylindrical portion.

5. The brushless motor according to claim 1, wherein:
the rotor magnet is fastened to an inner circumferential face of the second cylindrical portion;
the stator has a stator core fastened to an outer circumferential face of the first cylindrical portion; and
the stator core is disposed facing an inner circumferential face of the rotor magnet in a radial direction.

6. The brushless motor according to claim 2, wherein:
the rotor magnet is fastened to an inner circumferential face of the second cylindrical portion;
the stator has a stator core fastened to an outer circumferential face of the first cylindrical portion; and
the stator core is disposed facing an inner circumferential face of the rotor magnet in a radial direction.

7. The brushless motor according to claim 3, wherein the rotor magnet is fastened to an inner circumferential face of the second cylindrical portion;
the stator has a stator core fastened to an outer circumferential face of the first cylindrical portion; and
the stator core is disposed facing an inner circumferential face of the rotor magnet in a radial direction.

8. The brushless motor according to claim 4, wherein:
the rotor magnet is fastened to an inner circumferential face of the second cylindrical portion;
the stator has a stator core fastened to an outer circumferential face of the first cylindrical portion; and
the stator core is disposed facing an inner circumferential face of the rotor magnet in a radial direction.

9. The brushless motor according to claim 1, wherein the top end of the third cylindrical portion is fastened in direct contact to an outer circumference of the retaining plate, so that the retaining plate covers the rotor magnet, the second cylindrical portion, and the stator.

* * * * *